United States Patent [19]

Hayashi

[11] Patent Number: 5,422,681

[45] Date of Patent: Jun. 6, 1995

[54] SATELLITE BROADCAST RECEIVING APPARATUS CAPABLE OF FORMING CO-DISTRIBUTING SYSTEM

[75] Inventor: Toshihide Hayashi, Kanagawa, Japan

[73] Assignee: Sony Corporation, Tokyo, Japan

[21] Appl. No.: 245,063

[22] Filed: May 17, 1994

Related U.S. Application Data

[63] Continuation of Ser. No. 22,289, Feb. 25, 1993, abandoned.

[30] Foreign Application Priority Data

Mar. 30, 1992 [JP] Japan ................... 4-102541

[51] Int. Cl.⁶ .................... H04H 1/14; H04B 1/16; H04N 5/63
[52] U.S. Cl. .................... 348/730; 348/569; 455/3.2; 455/3.3; 455/229; 455/343
[58] Field of Search .......... 455/12.1, 13.4, 13.1, 455/343, 313, 3.2, 3.3, 229; 348/730, 569; 358/190

[56] References Cited

U.S. PATENT DOCUMENTS

| | | | |
|---|---|---|---|
| 5,134,486 | 7/1992 | Suzuki et al. | 455/343 |
| 5,313,282 | 5/1994 | Hayashi | 348/730 |
| 5,331,354 | 7/1994 | Koyama et al. | 348/730 |

FOREIGN PATENT DOCUMENTS

| | | | |
|---|---|---|---|
| 0418821 | 1/1992 | Japan | 455/13.4 |
| 2107539 | 4/1983 | United Kingdom | 455/12.1 |

*Primary Examiner*—Edward F. Urban
*Assistant Examiner*—Mark D. Wisler
*Attorney, Agent, or Firm*—Jay H. Maioli

[57] ABSTRACT

In a satellite broadcast receiving apparatus, when a signal reception is commenced, a receiving condition of an antenna input signal is detected under such a condition that a power supply to a down-converter is interrupted, and the power from a power source is supplied to the down-converter based upon the receiving condition. A simultaneous power supply to the down-converter can be prevented, and a co-distributing system can be reliably established in a simple manner.

2 Claims, 4 Drawing Sheets

5,422,681

SATELLITE BROADCAST RECEIVING APPARATUS CAPABLE OF FORMING CO-DISTRIBUTING SYSTEM

This is a continuation of application Ser. No. 08/022,289, filed Feb. 25, 1993.

BACKGROUND OF THE INVENTION

1. Field of the Invention

The present invention relates to a satellite broadcast receiving apparatus capable of commonly utilizing a single antenna by a plurality of receiving systems.

2. Description of the Prior Art

In such a conventional satellite broadcast receiving apparatus, a frequency of a reception signal is down-converted with employment of a down-converter installed just under an antenna, and a down-converted signal is conducted via a coaxial cable to a tuner for receiving a satellite broadcasting signal, which is installed within a room.

At this time, the conventional satellite broadcast receiving apparatus can supply power from a power source to the down-converter via the coaxial cable for the antenna output signal, so that the antenna can be installed with a simple wiring operation.

In an apartment such as a Penthouse, such a system has been established that power of a power source exclusively installed is supplied via a coaxial cable to a down-converter, and an output signal derived from the down-converter, which is transferred via this coaxial cable, is distributed to the respective homes or apartments (this will be referred to a "co-distributing system").

When the satellite broadcast receiving apparatuses are connected to such a co-distributing system, in the satellite broadcast receiving apparatus installed in the respective homes, if the power from the power source is supplied to the coaxial cable in a similar manner to the usual receiving system, then both of the power from the power source exclusively used to the co-distributing system and the power from the power source employed in this satellite broadcast receiving apparatus are supplied to the down-converter at the same time.

In this case, there is a risk that the down-converter connected to this coaxial cable may malfunction in the co-distributing system. In the worst case, the down-converter may catch fire.

As a consequence, in case of such a malfunction, the power supply control must be carried out with respect to the coaxial cables in the home-use satellite broadcast receiving apparatus.

In other words, the operation button for setting interruption of the power supply is provided in the conventional satellite broadcast receiving apparatus. The supply of the power derived from the power source of the satellite broadcast receiving apparatus is stopped by manipulating this operation button.

To the contrary, in the home use system similar to such a co-distributing system, there is a possibility that a down-converter is commonly utilized in a plurality of satellite broadcast receiving apparatuses. In this case, it is required to supply power from any one of these satellite broadcast apparatus to the down-converter, instead of the power source exclusively used for the co-distributing system. However, when the main power source is turned OFF in the conventional satellite broadcast receiving apparatus, the DC power supply to the down-converter is interrupted. As a result, if one satellite broadcast receiving apparatus is allocated to supply the power to the down-converter, when the main power supply of this satellite broadcast receiving apparatus is set to the OFF state, no satellite broadcasting program can be received by the remaining satellite broadcast receiving apparatuses.

Also, even when such one satellite broadcast receiving apparatus is allocated to supply the power to the down-converter, there is a risk that a user mistakenly operates this receiving apparatus. Accordingly, there is another problem that such a failure cannot be completely prevented.

SUMMARY OF THE INVENTION

The present invention has been made in an attempt to solve the above-described problems, and therefore, has an object to provide a satellite broadcast receiving apparatus capable of forming a reliable co-distributing system in a simple manner, if required.

To achieve the above-described object, a satellite broadcast apparatus according to the present invention is provided in which after an antenna input signal is down-converted by a down-converter, a down-converted antenna input signal is entered into a channel selecting circuit so as to receive a desired satellite broadcasting channel. Accordingly, upon commencement of a satellite broadcasting signal, an output signal derived from the down converter is received under such a condition that power of a power source is not supplied to the down-converter, and the power of the power source is supplied to the down-converter based upon a reception result of the output signal.

With the above-described arrangements, only when the power is not supplied to the down-converter from a separate power source, the power can be supplied thereto.

BRIEF DESCRIPTION OF THE DRAWINGS

For a better understanding of the present invention, reference is made to the detailed description in conjunction with the accompanying drawings, in which:

FIG. 3 schematically illustrates a display screen of the satellite broadcast apparatus shown in FIG. 1; and, FIG. 4 is a flow chart for explaining an operation of the satellite broadcast receiving apparatus when a power supply is turned ON.

DETAILED DESCRIPTION OF THE PREFERRED EMBODIMENTS

Referring now to the accompanying drawings, a satellite broadcast receiving apparatus according to a preferred embodiment of the present invention will be described.

It should be understood that since the below-mentioned preferred embodiment corresponds to a preferable concrete example of the present invention, various technical limitations are made thereto. However, the present invention is not limited to the preferred embodiment, but may be modified without departing from the technical scope and spirit of the invention.

(1) OVERALL ARRANGEMENT

Figure 1:
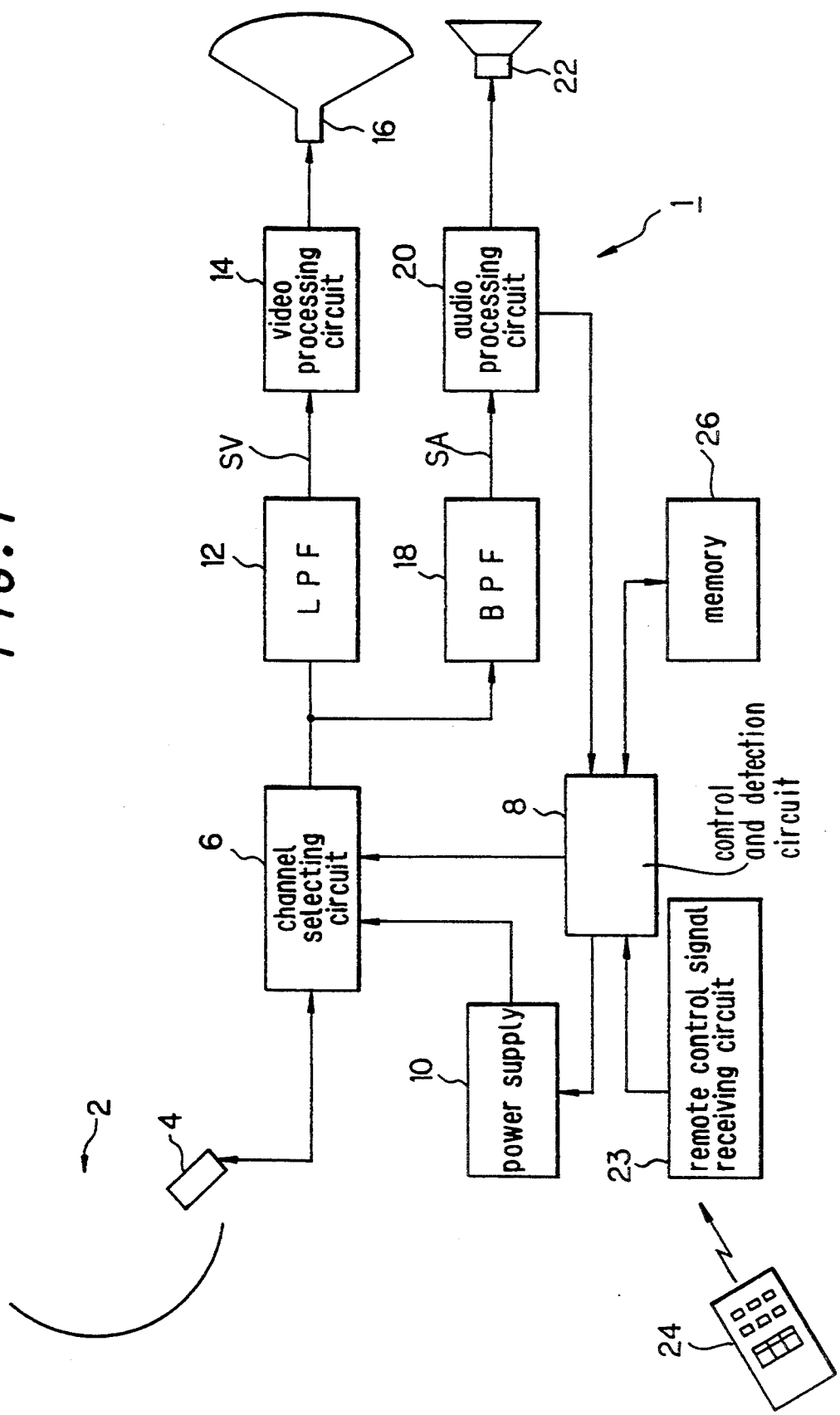
FIG. 1 is a schematic block diagram of an arrangement of a satellite broadcast receiving apparatus according to a preferred embodiment of the present invention.

In FIG. 1, there is shown a schematic block diagram of a satellite broadcast receiving apparatus according to a preferred embodiment of the present invention.

In the satellite broadcast receiving apparatus 1, a down-converter 4 is arranged near a focal point of a parabola antenna 2, and a satellite broadcasting signal is received by a waveguide positioned at a tip portion of this down-converter 4.

The down-converter 4 down-converts the frequency of this satellite broadcasting signal into a satellite broadcasting signal with a predetermined frequency lower than the first-mentioned frequency, and then outputs this down-converted satellite broadcasting signal via a coaxial cable to a channel selecting circuit 6.

At this time, the down-converter 4 is so designed that it is operable by DC power supplied via the coaxial cable from a DC power source. As a result, the satellite broadcasting programs may be received with a simple wiring work.

The channel selecting circuit 6 changes the operation in response to a control signal outputted from a control circuit 8, so that a desired channel is selected to be outputted.

In this preferred embodiment, the channel selecting circuit 6 demodulates the selected channel signal to obtain a video signal and an audio signal. As a result, this satellite broadcast receiving apparatus 1 is connected to a monitor unit having a video input terminal so as to simply monitor the satellite broadcasting programs.

Furthermore, the channel selecting circuit 6 receives a DC voltage of 15 V derived from a power supply circuit 10, and outputs this DV voltage to the down-converter 4 based on a control signal derived from the control and detection circuit 8.

A low-pass filter circuit (LPF) 12 supplies the video signal SV which has been demodulated by the channel selecting circuit 6, to a video processing circuit 14. The video processing circuit 14 demodulates this video signal to drive a cathode-ray tube 16, whereby the satellite broadcasting program is displayed on the cathode-ray tube 16.

A band-pass filter circuit (BPF) 18 supplies the audio signal SA of the satellite broadcasting program constructed of a PCM audio signal to an audio processing circuit 20. This audio processing circuit 20 demodulates this audio signal to be outputted from a speaker 22.

At this time, in the audio processing circuit 20, a detection is performed whether or not the satellite broadcasting program is present by detecting the PCM audio signal. Then, the detection result is outputted to the control and detection circuit 8.

The control and detection circuit 8 monitors an output signal of a remote control signal receiving circuit 23, so that when a remote controller 24 is manipulated, the overall operation of the satellite broadcast receiving apparatus 1 is changed in accordance with this operation of the remote controller 24.

At this time, the control and detection circuit 8 outputs the DC voltage for driving the down-converter 4 in accordance with mode information stored in a memory circuit 26. Thus, the co-distributing system can be reliably established in a simple manner.

Figure 2:
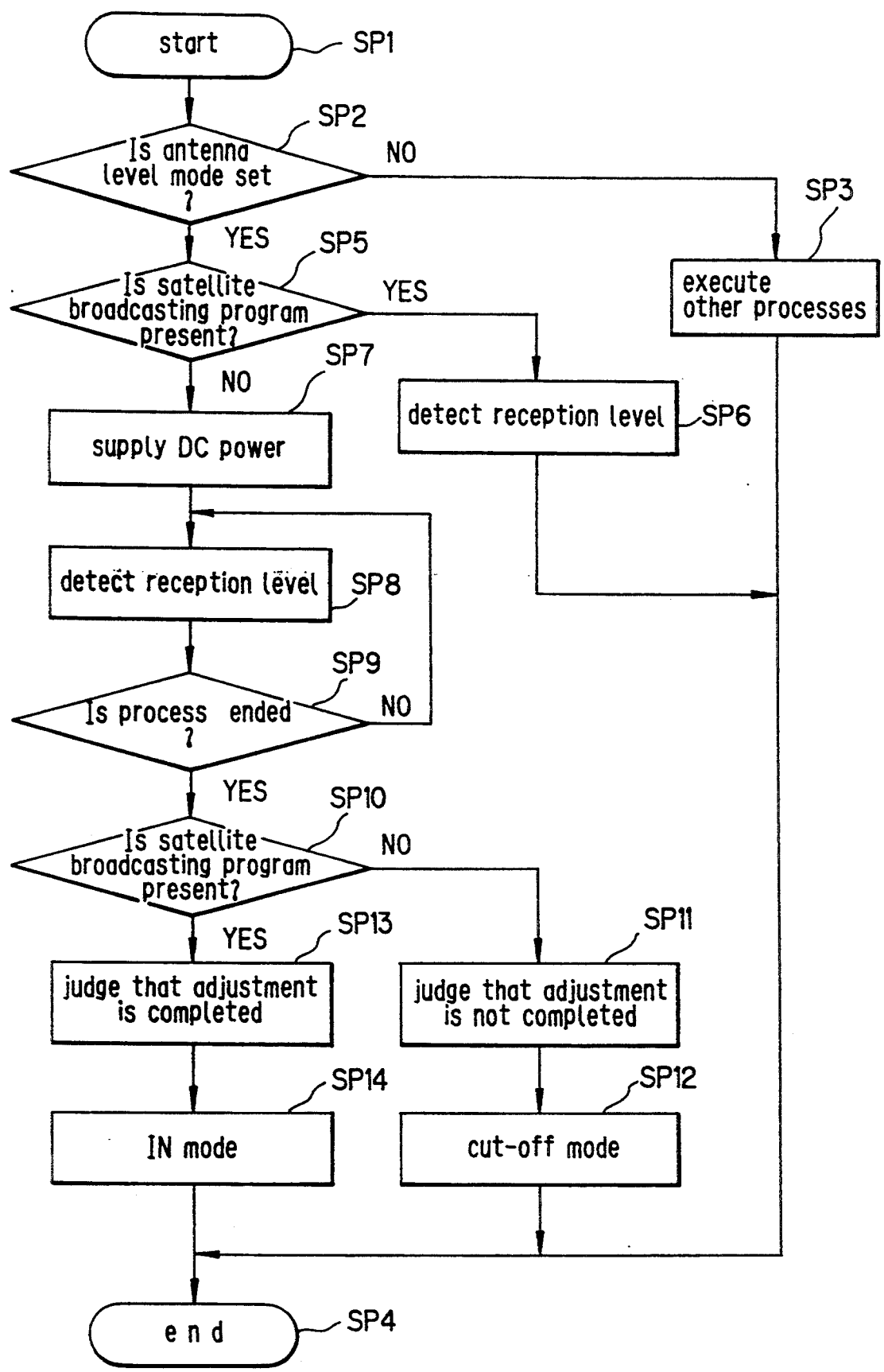
FIG. 2 is a flow chart for explaining an operation of the satellite broadcast receiving apparatus when an antenna is installed.

That is to say, the control and detection circuit 8 executes a process sequence as defined in a flow chart of FIG. 2 at a predetermined time period, and therefore supplies the DC voltage to the down-converter 4, if required, when an antenna level mode is set by operating the remote controller 24.

(2) Mode Setting Operation in Setting of Antenna

In the flow chart of FIG. 2, when the process operation is advanced from a step SP1 to a next step SP2, the control and detection circuit 8 judges whether or not the antenna level mode is set.

This antenna level mode is settable by depressing an operation button by a user during an installation of the satellite broadcast receiving apparatus 1. The satellite broadcast receiving apparatus 1 can detect a reception level of a satellite broadcasting signal in this antenna level mode.

Therefore, in the satellite broadcast receiving apparatus 1, various adjustments such as a direction of the antenna 2 can be performed in accordance with the detection results of the signal reception level when the antenna is installed.

In case that the antenna level mode is not set, the judgement result becomes NO at the step SP2 and then the process operation is advanced to a step SP3 at which the control and detection circuit 8 executes other processes (for example, when an operation button is depressed to turn OFF the power supply circuit, a process to cut off the power supply is executed). Thereafter, the process operation is advanced to a further step SP 4 at which this process operation is accomplished.

To the contrary, if the user depresses the operation button of the antenna level mode, the judgement result becomes YES at the step SP 2. Then, the control operation of the control and detection circuit 8 is advanced to a process operation defined at a step SP5.

Figure 3:
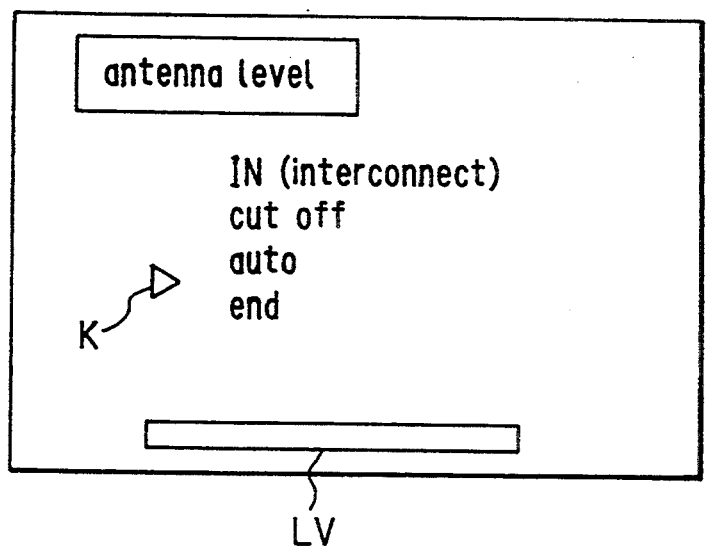

At this time, after a display image of an antenna level mode as illustrated in FIG. 3 has been displayed on the cathode-ray tube 16, while the control circuit 8 maintains an OFF-state of the power supply to the down-converter 4, the control detection circuit 8 judges whether or not a satellite broadcasting program can be received based upon the detection result of the audio processing circuit 20.

If the satellite broadcasting program can be received, it may be considered that the channel selecting circuit 6 is connected to the down-converter 4 which has been installed in the co-distributing system or the like, and at the same time, the DC voltage is applied to this down-converter 4. As a result, the control operation by the control and detection circuit 8 is advanced to a process operation as defined at a step SP 6.

At this step SP 6, the control and detection circuit 8 monitors the reception result of the channel selecting circuit 6, so that the reception level is detected and the detected reception level is displayed as a bar graph such as an "LV" at a button column of a display screen.

At the same time, the control and detection circuit 8 represents a cursor K at a display position of an "auto" indicative of an "automatic mode". After a predetermined time period has passed under such a condition, the display of the antenna level mode is interrupted. Subsequently, the process operation is advanced to a step SP 4 at which another process operation of this step is performed.

As a consequence, in such a case that the channel selecting circuit 6 is connected to the down-converter 4 which has been installed in the co-distributing system or the like and the DC power of the power supply circuit is supplied to the down-converter 4, the satellite broadcast receiving apparatus 1 sets the overall operation mode to the automatic mode and accomplishes the antenna level mode without supplying the DC power to the down-converter 4. Accordingly, the co-distributing system can be formed in a simple manner.

To the contrary, if the judgement result becomes "NO" at the step SP 5, it may be considered, or recognized a that a satellite broadcasting program is independently received, or the channel selecting circuit 6 is connected to the down-converter 4 to which the DC power is not supplied, although this down-converter 4 has been installed in the co-distributing system or the like. Thus, the process operation is advanced to a step SP 7 at which the DC voltage of the power supply circuit is applied to the down-converter Subsequently, the control operation by the control and detection circuit 8 is advanced to a next step SP 8 at which the reception level of the satellite broadcasting program is detected in a similar manner to that of the previous step SP 6 under control of the control and detection circuit 8. Then, this reception level is displayed as a barograph, and thereafter the process operation is advanced to a step SP 9.

At this step SP 9, the control circuit 8 judges whether or not the antenna level mode has been completed. If the judgement result becomes "NO", then the control operation of the control and detection circuit 8 is returned to the step SP 8.

As a consequence, the control and detection circuit 8 repeats a process loop constructed of the steps from SP-8 via SP-9 to SP-8, during which a user can adjust the direction of the parabola antenna 2, while observing the bar graph "LV" for confirmation.

To the contrary, when the user moves the curser "K" to the display position of the completion and turns ON the operation button, the judgement result of the step SP 9 becomes "YES", so that the control operation of the control and detection circuit 8 is advanced to a process operation at a step SP 10.

At this step SP 10, the control and detection circuit 8 judges whether or not a satellite broadcasting program is present in accordance with the judgement result of the audio processing circuit 20. If no satellite broadcasting program is received, then the process operation is advanced to a step SP 11 at which it may be judged that no adjustment of the antenna 2 is performed.

As a consequence, the control operation of the control and detection circuit 8 is advanced to a step SP 12 at which the cursor "K" is moved to a display position of "CUT OFF" on the display screen.

It should be noted that the representation of "CUT OFF" corresponds to such a mode that the power supply to the down-converter 4 is maintained under continuous interrupt condition (will be referred to a "cut-off mode" hereinafter), so that the simultaneous supply of the power is prevented.

Furthermore, after the control and detection circuit 8 stores the mode information about this cut-off mode into the memory 26 under such a condition, the display of the antenna level mode is interrupted when a predetermined time period has elapsed. Then, the process operation is advanced to the step SP 4, so that the process operation is ended.

To the contrary, if the judgement result becomes "YES" at the step SP 10, then the control operation of the control circuit 8 is advanced to a process operation defined at a step SP 13.

At this step, the control and detection circuit 8 judges that the adjustment of the antenna has been accomplished. Then, the control process of the control and detection circuit 8 is advanced to a further step SP 14 at which the cursor "K" is moved to a display position of "IN" on the display screen.

In this preferred embodiment, the representation of "IN" implies such a mode that the DC voltage is applied to the down-converter 4 is conjunction with the main power supply (will be referred to as an "IN mode"). Accordingly, the power is supplied to the down-converter 4, if required, so that a satellite broadcasting program can be received.

Furthermore, under such a condition, mode information about this IN mode is stored into the memory 26 under the control of the control and detection circuit 8. When a predetermined time period has elapsed, the display screen of the antenna level mode is interrupted by this control and detection circuit 8. Thereafter, the process operation is advanced to the previous step SP 4 at which the process operation is completed.

As a result, in the antenna level mode when the antenna is installed, the control and detection circuit 8 can set a power supply mode. Subsequently, a power supply is controlled in accordance with this power supply mode.

(3) Operations of Various Modes

A description will now be made of operations of various modes.

In case of the cut-off mode, the control and detection circuit 8 continuously interrupts the power supply to the down-converter 4, whereas in case of the IN mode, the power is supplied to the down-converter 4 in connection with the main power supply under control of the control and detection circuit 8.

Figure 4:
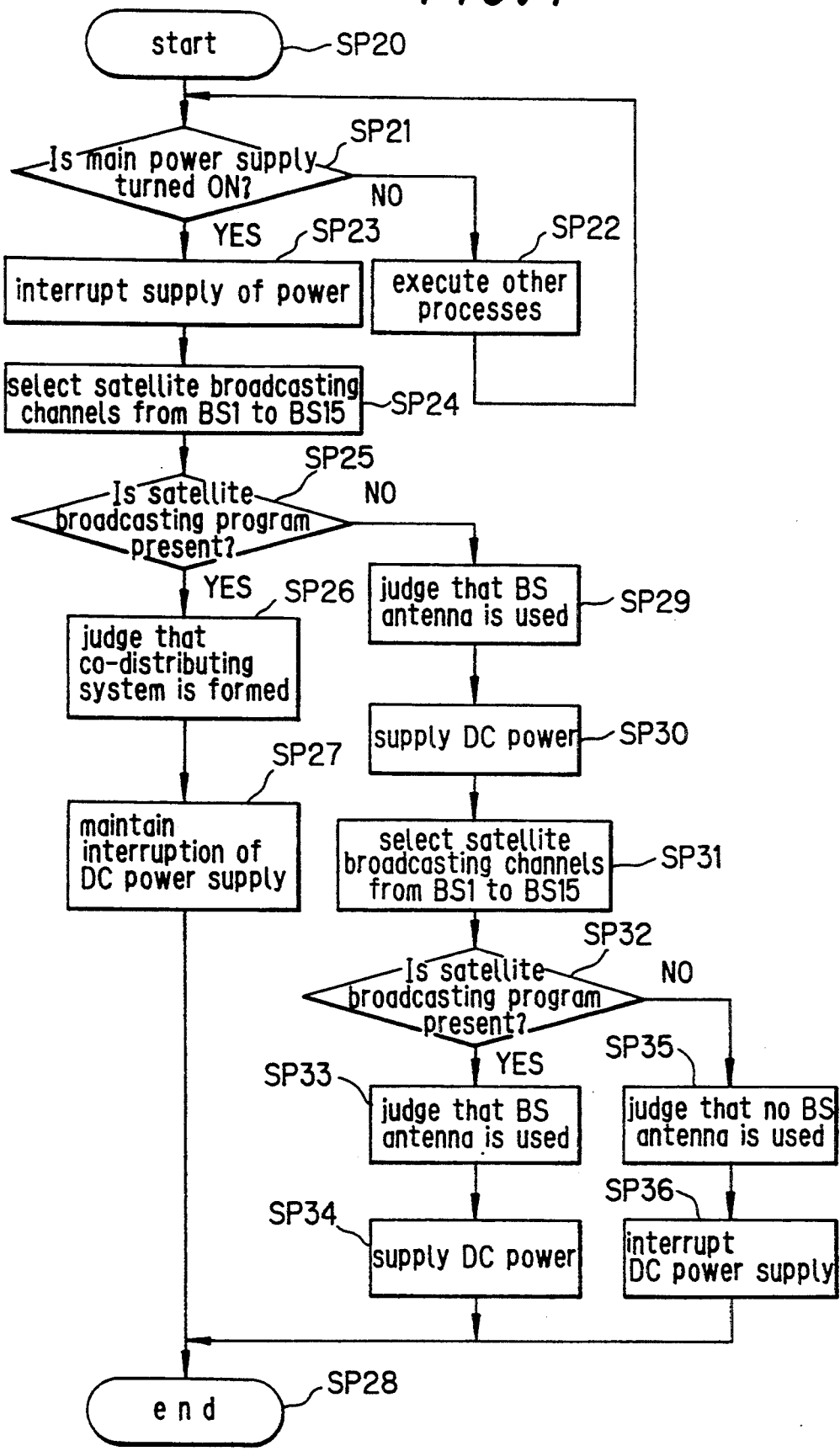

In contrast, when the automatic mode is set, the control and detection circuit 8 executes a process sequential operation as shown in FIG. 4, whereby the power is supplied to the down-converter 4, if required.

That is to say, the control operation of the control circuit 4 is advanced from a step SP 20 to a step SP 21, at which a judgment is made whether or not the main power supply switch is turned ON.

If the judgment result becomes "NO", then the control operation of the control and detection circuit 8 is advanced to a step SP 22 at which the control and detection circuit 8 executes other process and the process operation is returned to a step SP 21.

To the contrary, if the judgment results becomes "YES", then the control operation of the control and detection circuit 8 is advanced to a step SP 23 at which the control and detection circuit 8 controls to interrupt a power supply to the down-converter 4, and thereafter the process operation is moved to a step SP 24.

At this step SP 24, the satellite broadcasting channels from the first channel to the fifteenth channel are successively selected and also reception levels are successively detected by the control and detection circuit 8.2

Subsequently, the control operation of the control and detection circuit 8 is advanced to a step SP 25 at which a judgment is made as to whether or not any of these satellite broadcasting channels from the first channel to the fifteenth channel has been received. If the judgement result becomes "YES", then the control operation by the control circuit 8 is advanced to a step SP 26.

In this case, even when no power of the power supply is supplied to the down-converter 4, the satellite broadcasting program can be received, so that the control and detection circuit 8 judges that it is the co-distributing system.

Subsequently, the control operation of the control circuit 8 is advanced to a step SP 27 at which the power supply condition is brought into the interrupt condition. Then, the process operation is advanced to a step SP 28 at which the process sequential operation is accomplished.

As a consequence, even when the co-distributing system is formed, it is possible to prevent the simultaneous power supply to the down-converter 4, and therefore the co-distributing system can be reliably established in a simple manner.

To the contrary, if the judgment result becomes "NO" at the step SP 25, then the control operation of the control circuit 8 is advanced to a step SP 29 at which a judgment is made as to whether or not an antenna exclusively used to receive a satellite broadcasting program has been connected. Subsequently, the control operation of the control circuit 8 is advanced to a further step SP 30.

At this step SP 30, after the control detection circuit 8 starts to apply a DC voltage of the power supply circuit 10 to the down-converter 4, the control operation of the control circuit 8 is advanced to a step SP 31. At the step SP 31, the satellite broadcasting channels from the first channel to the fifteenth channel are sequentially selected to detect the reception levels of the channel signals under control of the control and detection circuit 8. Thereafter, the process operation is advanced to a step SP 32 at which a judgement is made as to whether or not any of these broadcasting channels can be received.

If the judgement result becomes "YES" at this step SP 32, then the control operation of the control and detection circuit 8 is advanced to a next step SP 33 at which the control and detection circuit 8 judges that the antenna exclusively used to receive satellite broadcasting programs has been surely connected. Then, the process operation is advanced to a step SP 34.

At this step SP 34, while the DC power supply to the down-converter 4 is maintained, the control operation of the control and detection circuit 8 is advanced to a step SP 28 at which the process sequential operation is accomplished.

Consequently, in accordance with the satellite broadcast receiving apparatus 1, not only even when the co-distributing system is fabricated, but also even when the satellite broadcasting program is solely received, the power supply to the down-converter 4 can be reliably established in a simple manner, and therefore, an easy operation of this satellite broadcast receiving apparatus 1 can be achieved.

Furthermore, if the power is supplied from the power supply circuit based upon the reception result, no operation button to switch the power supply is longer required, so that the entire arrangement of this receiving apparatus can be made compact.

To the contrary, if the judgement result becomes "NO" at the step SP 32, then the control operation of the control and detection circuit 8 is advanced to a step SP 35. At this step, the control and detection circuit 8 judges that the antenna is not actually utilized due to some reason such as that the coaxial cable is not connected to the channel selecting circuit 6.

As a consequence, the control operation of the control and detection circuit 8 is advanced to a next step SP 36 at which the DC power supply to the down-converter 4 is interrupted under control of the control and detection circuit 8. Subsequently, the process operation is advanced to a step SP 28 at which the above-described process sequential operation is accomplished.

As a consequence, a waste of power can be prevented under control of the control and detection circuit 8.

With the above-described circuit arrangement, when a satellite broadcasting program reception is commenced, the reception level of the satellite broadcasting signal is detected under such a condition that the power supply to the down converter 4 is interrupted. Based upon the results of the signal levels, the power derived from the power supply is supplied to the down-converter 4, so that the power can be supplied thereto only when it is required. As a consequence, the co-distributing system can be reliably formed in a simple manner, if required.

It should be noted that although it has been assumed in describing the preferred embodiment that not only the automatic mode but also the cut-off mode have been set, the present invention is not limited thereto, but may be modified. For instance, only the automatic mode may be employed, if required.

Furthermore, in the above-described preferred embodiment the satellite broadcasting channels from the first channel to the fifteenth channel are selected and the reception signal levels are detected. The present invention is not restricted to this preferred embodiment, but may be modified. For example, a judgement may be made based upon a reception level of a preselected channel, if required.

As previously described in detail, in accordance with the present invention, it is possible to provide such a satellite broadcast receiving apparatus that the reception conditions are detected under such a condition that the power supply to the down converter is interrupted when the satellite broadcasting signal is received, and the power from the power source is supplied based upon the detection result of the satellite broadcasting signal. As a consequence, the power from the power supply can be supplied to the down converter only when it is required. Thus, the co-distributing system can be reliably formed in a simple manner.

What is claimed is:

1. A satellite broadcast receiving apparatus in a co-distributing system having a system power source, said apparatus comprising:

a receiving apparatus power source separate from said system power source;

a down-converter mounted closely adjacent to an antenna and responsive to an antenna input signal for producing a down-converted antenna input signal, said down-converter is selectively powered by said receiving apparatus power source or said system power source;

a channel selecting circuit that receives said down-converted antenna input signal and selects a desired satellite broadcasting channel; and a control and detection circuit for controlling said channel selecting circuit, controlling said selectively supplied power to said down-converter, and detecting a presence or absence of the reception of a satellite broadcasting signal and an output signal derived from said down-converter; and wherein when said down-converter is powered by said system power source and upon reception of said satellite broadcasting signal and said control and detection circuit responsive to said corresponding output signal derived from said down-converter, said control and detection circuit automatically interrupts the output of the power from said receiving apparatus power source to said down-converter, and upon detection by said control and detection circuit of an absence of reception of said satellite broadcasting signal and said output signal derived from said down-converter, said control and detection circuit enables said receiving apparatus power source for supplying power to said down-converter.

2. A satellite broadcast receiving apparatus in a co-distributing system having a system power source and an antenna for receiving a satellite broadcast signal, said apparatus comprising:

a receiving apparatus power source separate from said system power source;

a down-converter mounted closely adjacent to said antenna and responsive to an antenna input signal for producing a down-converted antenna input signal representing a satellite broadcast program, said down-converter selectively powered by said receiving apparatus power source or said system power source; and a control and detection circuit for detecting a presence or absence of said down-converted antenna input signal and for controlling said receiving apparatus power source, whereby when said down-converter is powered by said system power source and upon detection of said down-converted antenna input signal by said control and detection circuit, said control and detection circuit disables said receiving apparatus power source from supplying the power to said down-converter, and upon detection of an absence of said down-converted antenna input signal by said control and detection circuit, said control and detection circuit enables said receiving apparatus power source for supplying power to said down-converter.

* * * * *